United States Patent [19]

Reese et al.

[11] 4,423,425

[45] Dec. 27, 1983

[54] THERMAL PRINT HEAD HAVING GLAZED METAL SUBSTRATE

[75] Inventors: Dennis L. Reese, Rochester; John L. Regehr, Stewartville, both of Minn.; Albert E. Schierhorst, Boca Raton, Fla.; Ronald L. Soderstrom, Rochester, Minn.; James M. Thompson, Poughkeepsie, N.Y.

[73] Assignee: International Business Machines Corporation, Armonk, N.Y.

[21] Appl. No.: 344,439

[22] Filed: Feb. 1, 1982

[51] Int. Cl.[3] .............................................. G01D 15/10

[52] U.S. Cl. ................................................ 346/76 PH

[58] Field of Search .......................... 346/76; 400/120; 219/216 PH

[56] References Cited

U.S. PATENT DOCUMENTS

| | | | |
|---|---|---|---|
| 3,950,200 | 4/1976 | Muramoto et al. | 219/216 PH X |
| 4,030,408 | 6/1977 | Miwa | 346/76 PH X |
| 4,374,385 | 2/1983 | Yoshizaki et al. | 346/76 PH X |

FOREIGN PATENT DOCUMENTS

| | | | |
|---|---|---|---|
| 2471864 | 6/1981 | France | 346/76 PH |
| 56-132094 | 10/1981 | Japan | 346/76 PH |

OTHER PUBLICATIONS

I.B.M. Technical Disclosure Bulletin, vol. 22, No. 8A, Jan. 1980, Regehr et al., Thermal Print Assembly, pp. 3337 to 3341.

I.B.M. Technical Disclosure Bulletin, vol. 21, No. 1, Jun. 1978, pp. 284–285.

*Primary Examiner*—Donald A. Griffin

*Attorney, Agent, or Firm*—J. Michael Anglin

[57] ABSTRACT

A procelain glazed metal bar has a rounded edge carrying a line of deposited print elements. Conductive lands deposited on both sides of the glazed bar connect the print elements to contacts for external circuitry.

6 Claims, 3 Drawing Figures

THERMAL PRINT HEAD HAVING GLAZED METAL SUBSTRATE

BACKGROUND

The present invention relates to non-impact thermal printing, and more particularly concerns a print head having a large number of printing dots placed along a supporting substrate.

The technology of thermal printing offers a lowcost method of providing printed output, especially for applications where permanence is not required, such as in transaction recorders, screen copying for data-entry terminals, and calculators. In order to enhance the cost advantage of thermal printers, moving parts should be eliminated wherever possible. One approach to this goal is to construct a print head extending across the document and having a separate small heat-producing print element capable of creating a print dot for each position at which a dot-matrix character can be printed. The elements are energized in parallel as the document moves transversely to the fixed-position print head, thus printing an entire horizontal row of dots at a time for every character in a print line, rather than printing one character at a time across the line with a moving head.

SUMMARY OF THE INVENTION

This approach requires a rugged, dimensionally stable print head containing a very large number of individual print elements which can nevertheless be manufactured inexpensively. The present invention provides a single-piece print head which can easily be made eight inches or more long, with 100 or more print elements per inch, and yet which requires no exotic or expensive manufacturing technologies.

Broadly speaking, the present invention provides a print head for thermal or related non-impact printing techniques, made of a glazed or porcelainized metal substrate having a rounded edge. A set of individual print elements is deposited substantially in a line along the rounded edge. Deposited conductive lands lead away from the print elements, preferably on both sides of the rounded edge, to provide electrical contacts for the elements.

Glazed metal articles are inexpensive and have a well-developed manufacturing technology. Such articles have recently been used instead of printed-circuit boards as substrates for electronics and microelectronics circuitry; their ruggedness and heat-dissipation capabilities in this field are excellent, and the technology of depositing or otherwise placing circuitry on them is not difficult or expensive. The deposition of print elements on top of a rounded edge of this type presents a mesa structure, allowing a self-cleaning action. Using both sides of the rounded edge for land patterns enables the higher heat-dissipation capability of the substrate to be effectively used to increase the potential number of print elements per unit of length. Using both sides for land patterns also allows wider conductors to provide increased current-carrying capability, lower ohmic losses in the conductors, and improved reliability. This configuration further facilitates a simple interconnection between the print head and external drive circuits, for easy assembly and replacement; it also lowers overall cost by requiring only the print elements (i.e., heating resistors) themselves to be placed on the head.

These and other advantages and features of the invention, as well as modifications obvious to those skilled in the art, will become apparent from the following detailed description of a preferred embodiment.

DETAILED DESCRIPTION

Figure 1:
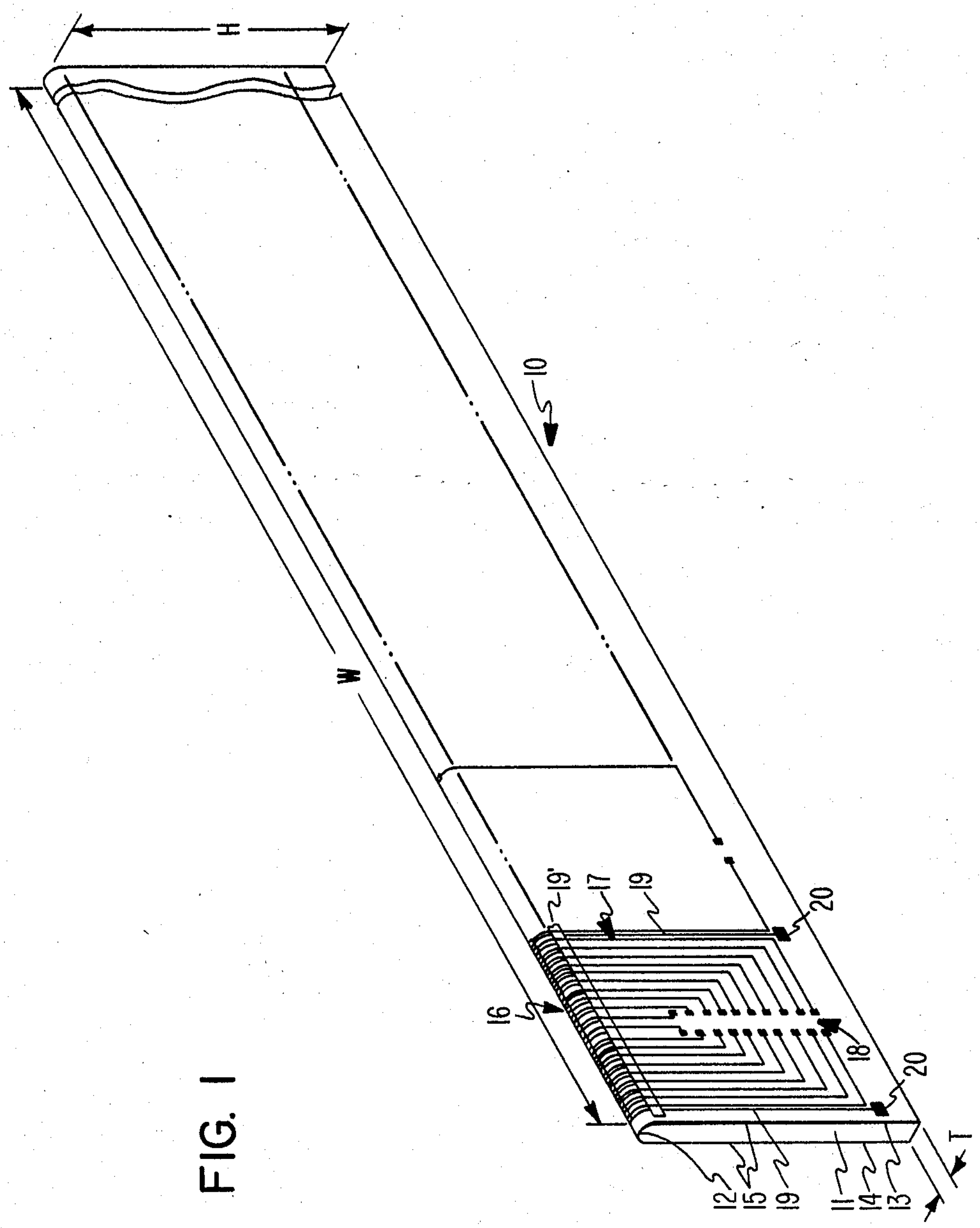
FIG. 1 is a view of a thermal print head constructed according to the present invention.
Figure 2:
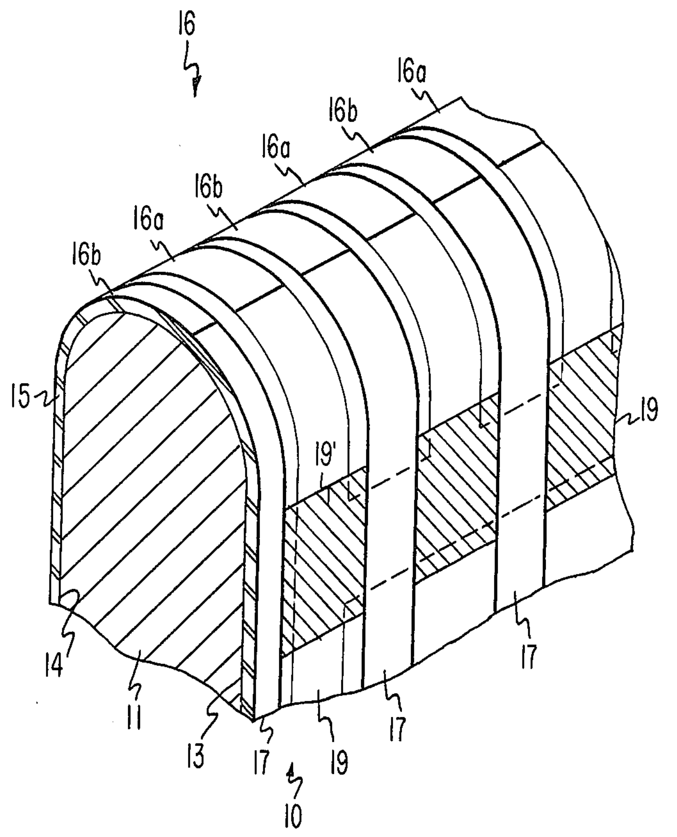
FIG. 2 shows an enlarged view, partially in cross section of the print head of FIG. 1.

Print head 10, FIGS. 1 and 2, is made from a planar metal bar 11, preferably steel or aluminum for low material cost, easy manufacturability, and good heat dissipation. The dimensions will of course vary with the particular application; an eight inch length of print elements (W=8" in FIG. 1) with 100 elements per inch, for example, would permit up to 16 characters per inch over a standard 8½" document. Other dimensions for this example are a height H=1½" and a thickness T=0.160". The exact cross section of rounded edge 12 is not critical, although corners and sharp radii should be avoided. This example shows a substantially semicircular edge 12. Edge 12 and the flat surfaces 13, 14 of bar 11 are covered with an electrically insulating coating 15. Coating 15 is a conventional porcelain glaze applied by any of a number of well-known processes. In the present example, glaze 15 is about 0.002 inch thick. It is preferably formed by a conventional spray process over the substrate, to control surface smoothness. Other conventional glazing techniques, such as dip or squeegee, may be employed as well.

Print elements 16 are electrical resistors spaced about 0.010 inch along the midline of rounded edge 12. They are formed of tantalum nitride rectangles about 0.010 inch long by 0.009 inch wide. Separate conductive lands 17 run from one subset **16*b* of elements 16 to contact pads 18 on side 13 of head 10. Similar lands and pads (not shown) on side 14 connect to the remaining subset 16*a* of elements 16. Placing contacts on both sides of head 10 in this alternating configuration increases the allowable spacing between conductive lands 17** for more current-carrying capability and for more reliable connection to external driver circuits.

A second connection to print elements **16*a* is formed by common lands 19, which run to contact pads 20. A second set of common lands (not shown) connects elements 16*b* to similar pads on side 14 of head 10. A layer of insulating material 19' separates lands 17 from common lands 19. Common lands 19 may be made wider than lands 17 for greater current capability. Each common land 19 and contact 20 provides an electrical return for a fixed group of print elements 16**. In the present example, each serves forty print elements. The common lands and contacts for each group of elements may be connected to those for the other groups, or may be made electrically separate. Separation may in some cases be desirable to allow groups of print elements to be switched on sequentially by means of the return lead; this might be used, e.g. in slower battery-powered printers to reduce peak power.

Standard photolithographic techniques can be used to establish the patterns for deposited layers 16, 17, 19 and 19'. Common lands 19 (and the corresponding common lands, not shown, on side 14) and first formed by depositing a layer of copper at least 25 microns thick.

Insulator 19' is then deposited as a 25 micron thick layer of Mylar or Kapton (trademarks of E. I. du Pont de Nemours & Co.) plastics, or any of a number of other conventional depositable insulators. Next, lands 17 and pads 18 are deposited as a 25 micron or thicker layer of copper. Although pads 18 must be left exposed, the layers 17 and 19 may be protected by a layer of Mylar ® or Kapton ® applied over the remaining surface of head 10. Also, print elements 16 may be covered with wear coatings of silicon dioxide, tantalum oxide, silicon nitride, or silicon carbide, as in conventional practice.

Head 10 may be physically supported in a printer (not shown) by any of a large number of conventional fastening methods. Pads 18 may be electrically coupled to external driver circuits by conventional connectors such as compressible flexible multi-conductor strip manufactured by AMP Corp. under the trademark Ampliflex. This and other similar compressible connectors do not require precise registration of the connector insert.

Figure 3:
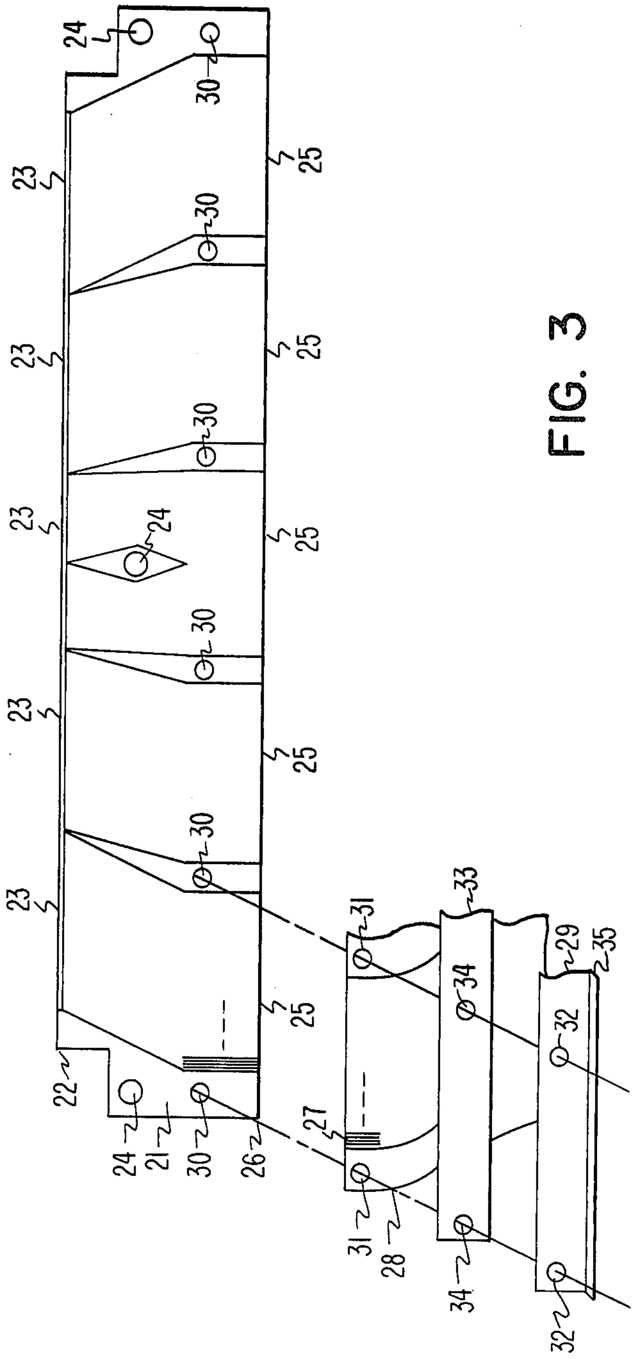
FIG. 3 shows another print-head configuration according to the invention.

FIG. 3 shows a slightly different head designed for physical size compatibility with an existing thermal print head. Bar 21 has a rounded edge 22 carrying five groups 23 of print elements over a total length of eight inches. Mounting holes 24 provide physical support and alignment in a printer housing (not shown). Individual and common conductors 25 for each group of elements are all brought out perpendicular to both sides of rear edge 26 of bar 21. This allows conductors 27 and conventional flexible printed circuits 28 to be clamped by means of bars 29. Holes 30 and 31 provide the necessary alignment between conductors 25 and 27 by means of clamping bolts or similar means (not shown) passed through holes 30, 31, 32 and 34. A strip 33 of compressible insulating material may be placed between bar 29 and circuit 28 to maintain pressure for better electrical contact between conductors 25 and 27. The strip is preferably of polyurethane foam or other material which does not take a set. Moreover, bar 29 may have a slight bend or angle 35 for increased rigidity along its length.

Since the individual materials and processes useful in fabricating the present invention are entirely conventional and well known, many modifications will be apparent to those skilled in the art. The invention is also in a position to take advantage of new technologies developed for other purposes. Although the invention was developed for thermal printers, electro-erosion and similar types of non-impact printers may use the same concepts with minor modifications well within the skill of the art.

Having described a preferred embodiment thereof, we claim as our invention:

1. A thermal print head, comprising:
   - a substantially planar metal substrate having a rounded edge;
   - an insulating glaze on said substrate;
   - a plurality of thermal print elements disposed on said rounded edge; and
   - a plurality of conductive lands on said substrate and contacting each of said print elements.

2. The thermal print head of claim 1, wherein said substrate has two substantially flat surfaces, each of said surfaces carrying a subset of said lands connected to respective ones of a subset of said print elements, a common land connected to all of another subset of said print elements and an insulating layer separating said subset of lands from said common land.

3. The thermal print head of claim 1, wherein said print elements comprise thin-film resistive layers deposited on said substrate.

4. The thermal print head of claim 1, wherein said rounded edge is substantially semicircular in cross section.

5. The thermal print head of claim 1, wherein said glaze is a sprayed procelain glaze.

6. The thermal print head of claim 1, wherein said print elements are disposed in a single line on said rounded edge.

* * * * *